US011518588B2

(12) United States Patent
Taylor

(10) Patent No.: US 11,518,588 B2
(45) Date of Patent: Dec. 6, 2022

(54) UTENSIL PROTECTION DEVICE

(71) Applicant: Shawn Taylor, New Orleans, LA (US)

(72) Inventor: Shawn Taylor, New Orleans, LA (US)

( * ) Notice: Subject to any disclaimer, the term of this patent is extended or adjusted under 35 U.S.C. 154(b) by 494 days.

(21) Appl. No.: 16/542,459

(22) Filed: Aug. 16, 2019

(65) Prior Publication Data
US 2021/0047092 A1   Feb. 18, 2021

(51) Int. Cl.
| B65D 51/24 | (2006.01) |
| B65D 85/00 | (2006.01) |
| A47G 21/14 | (2006.01) |
| B26B 29/02 | (2006.01) |
| A47J 47/16 | (2006.01) |

(52) U.S. Cl.
CPC ......... B65D 51/246 (2013.01); A47G 21/14 (2013.01); A47J 47/16 (2013.01); B65D 85/54 (2013.01); B26B 29/02 (2013.01)

(58) Field of Classification Search
CPC ...... B65D 51/246; B65D 85/54; A47G 21/14; A47G 21/145; A47G 21/16; B26B 29/02; B26B 29/04; B26B 29/025
USPC ........ 206/349, 553, 209, 1.9, 207; 220/4.22, 220/570, 4.24–4.26
See application file for complete search history.

(56) References Cited

U.S. PATENT DOCUMENTS

| 1,041,315 | A | * | 10/1912 | Marx | B65D 81/264 |
| | | | | | 401/268 |
| 1,869,753 | A | * | 8/1932 | Kamm | B44D 3/125 |
| | | | | | 206/361 |
| 4,802,576 | A | * | 2/1989 | Kern | B44D 3/126 |
| | | | | | 206/229 |
| 5,076,460 | A | * | 12/1991 | Hussell | B65D 43/164 |
| | | | | | 220/4.22 |
| 5,540,363 | A | * | 7/1996 | Wilson | B44D 3/125 |
| | | | | | 220/4.23 |
| 6,530,470 | B2 | * | 3/2003 | Roundy | B44D 3/00 |
| | | | | | 15/257.06 |
| 7,434,684 | B1 | * | 10/2008 | Mabra | F42B 39/007 |
| | | | | | 220/4.23 |
| 8,505,768 | B2 | * | 8/2013 | Bardwell | A47G 23/06 |
| | | | | | 220/4.23 |
| 9,084,474 | B2 | * | 7/2015 | DePaola, Jr. | B44D 3/123 |
| 9,707,841 | B2 | * | 7/2017 | Arold | F17C 13/084 |
| 2005/0061695 | A1 | * | 3/2005 | Nogin | A47L 13/51 |
| | | | | | 206/349 |

FOREIGN PATENT DOCUMENTS

WO   WO-0121034 A2 *  3/2001   ............ A46B 17/04

* cited by examiner

*Primary Examiner* — Rafael A Ortiz
(74) *Attorney, Agent, or Firm* — The Iwashko Law Firm, PLLC; Lev Ivan Gabriel Iwashko

(57) ABSTRACT

A utensil protection device, including a main body to store a head of a utensil therein, a plurality of sealing members removably disposed on a first end of the main body within at least a portion of the main body to prevent the head of the utensil from contamination, and a hinge disposed on a second end of the main body to facilitate movement of the main body from closed in a first position to at least partially opened in a second position.

5 Claims, 4 Drawing Sheets

UTENSIL PROTECTION DEVICE

BACKGROUND

1. Field

The present general inventive concept relates generally to a protection device, and particularly, to a utensil protection device.

2. Description of the Related Art

Kitchen utensils are tools used for preparing food or eating food. Generally, the kitchen utensils are stored in a drawer, a cabinet, and/or hung from a rack. Storing the kitchen utensils keeps them organized and in a location from which they may always be retrieved.

However, during use, people and/or animals may expose the kitchen utensils to weather and/or contamination. For example, during a cookout, a host may provide the kitchen utensils for guests that remain out in the open. Unfortunately, the guests and insects may come in contact with the kitchen utensils that inadvertently spreads dirt and/or bacteria.

Therefore, there is a need for a portable container to protect a head of the kitchen utensils from becoming contaminated.

SUMMARY

The present general inventive concept provides a utensil protection device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a utensil protection device, including a main body to store a head of a utensil therein, a plurality of sealing members removably disposed on a first end of the main body within at least a portion of the main body to prevent the head of the utensil from contamination, and a hinge disposed on a second end of the main body to facilitate movement of the main body from closed in a first position to at least partially opened in a second position.

The main body may include a first section, and a second section to pivot with respect to the first section.

The plurality of sealing members may include a first seal removably disposed within a first end of the first section, and a second seal removably disposed within a first end of the second section.

The hinge may include a first angled bracket disposed on a second end of the first section to prevent movement of the first section beyond a predetermined position in response to contact with at least a portion of the second section, and a second angled bracket disposed on a second end of the second section to prevent movement of the second section beyond the predetermined position in response to contact with at least a portion of the first section.

Each of the plurality of sealing members deforms in response to contact with at least a portion of the utensil.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
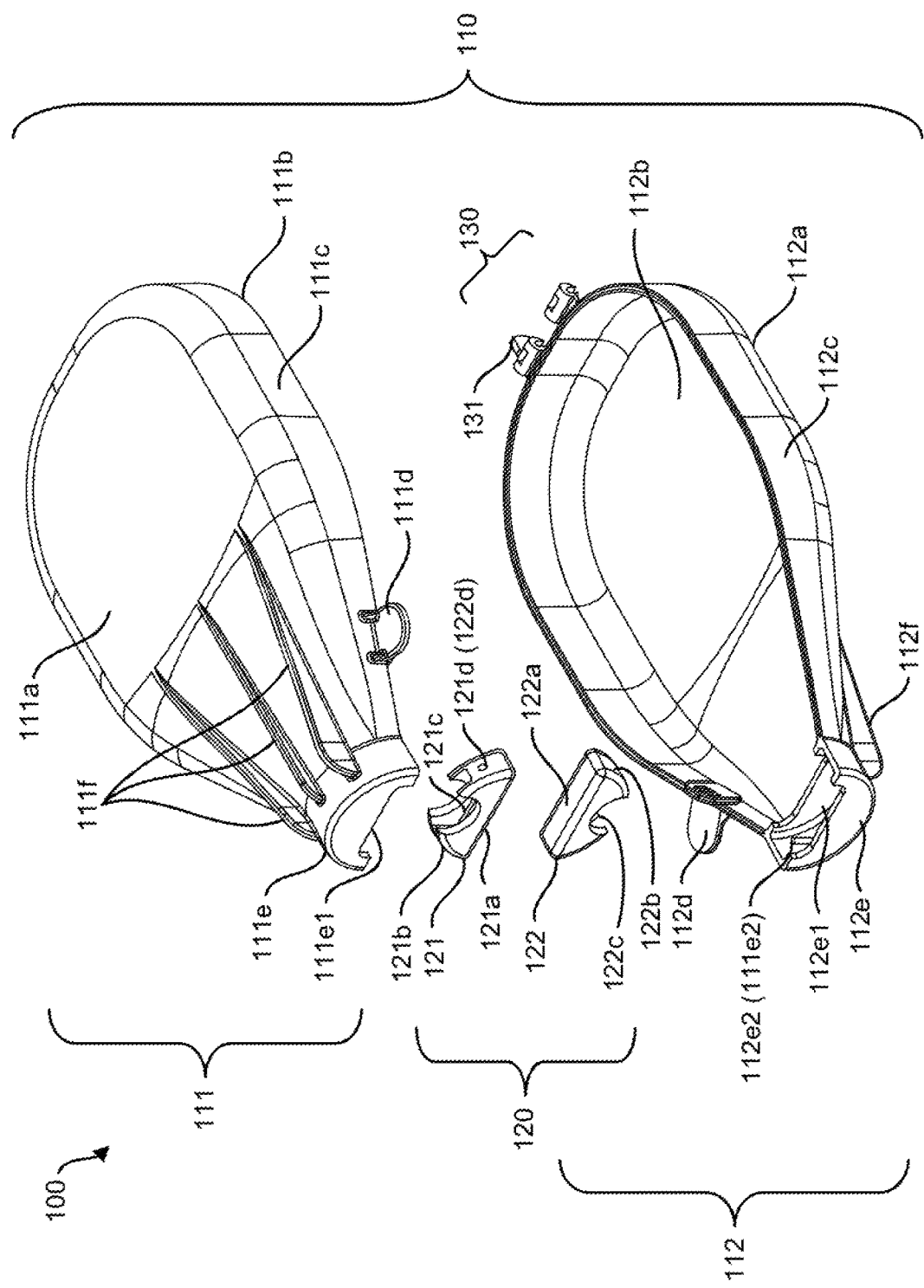
FIG. 1 illustrates an exploded view of a utensil protection device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Utensil Protection Device 100
Main Body 110
First Section 111
First Outer Surface 111a
First Inner Surface 111b
First Side Wall 111c
First Tab 111d
First Semicircular Portion 111e
Seal-Receiving Groove 111e1
Interlocking Member 111e2
Supporting Members 111f
Second Section 112
Second Outer Surface 112a
Second Inner Surface 112b
Second Side Wall 112c
Second Tab 112d
Second Semicircular Portion 112e
Seal-Receiving Groove 112e1
Inventor(s): Taylor, Shawn Non Provisional Patent Application
Interlocking Member 112e2
Supporting Members 112f
Sealing Members 120
First Seal 121
First Planar Surface 121a
First Semicircular Surface 121b
First Recessed Portion 121c
First Interlocking Member-Receiving Aperture 121d
Second Seal 122
Second Planar Surface 122a
Second Semicircular Surface 122b
Second Recessed Portion 122c
Second Interlocking Member-Receiving Aperture 122d
Hinge 130
First Angled Bracket 131
Second Angled Bracket 132

FIG. 1 illustrates an exploded view of a utensil protection device 100, according to an exemplary embodiment of the present general inventive concept.

Figure 2:
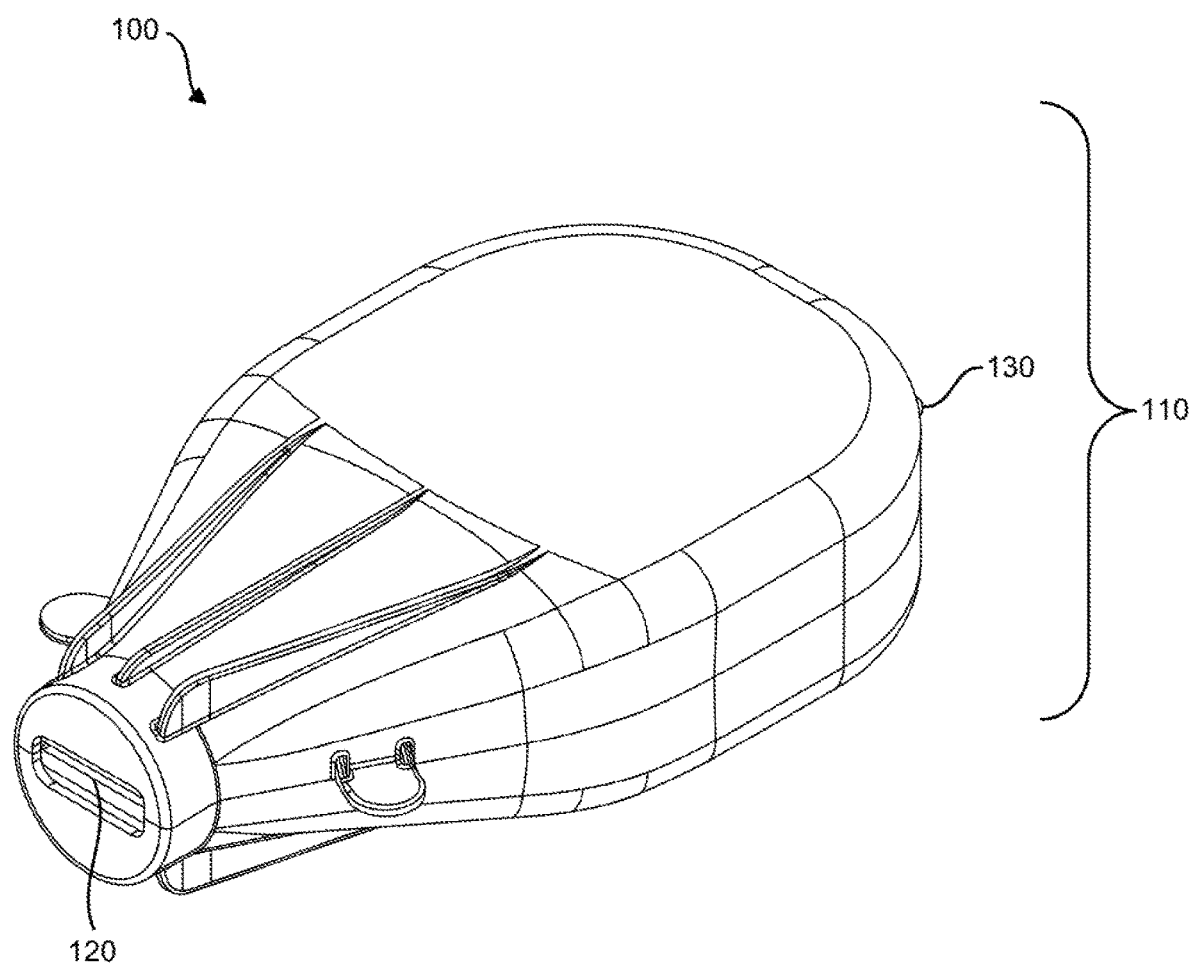
FIG. 2 illustrates a top isometric view of the utensil protection device, according to an exemplary embodiment of the present general inventive concept.

FIG. 2 illustrates a top isometric view of the utensil protection device 100, according to an exemplary embodiment of the present general inventive concept.

The utensil protection device 100 may be constructed from at least one of metal, plastic, wood, glass, and rubber, etc., but is not limited thereto.

The utensil protection device 100 may include a main body 110, a plurality of sealing members 120, and a hinge 130, but is not limited thereto.

Referring to FIGS. 1 and 2, the main body 110 is illustrated to have a circular portion at a first end and a curved portion at a second end. However, the main body 110 may be a rectangular prism, rectangular, circular, pentagonal, hexagonal, octagonal, or any other shape known to one of ordinary skill in the art, but is not limited thereto.

The main body 110 may be constructed to be opaque and/or transparent.

The main body 110 may include a first section 111 and a second section 112, but is not limited thereto.

The first section 111 may include a first outer surface 111a, a first inner surface 111b, a first side wall 111c, a first tab 111d, a first semicircular portion 111e, and a plurality of supporting members 111f, but is not limited thereto.

The first outer surface 111a may be disposed on any object and/or any external surface, such as a table and/or a countertop. The first inner surface 111b may receive at least one item thereupon. The first side wall 111c may be disposed around the first outer surface 111a. Moreover, the first side wall 111c may extend in a direction away from the first outer surface 111a, such that the first side wall 111c may be elevated with respect to the first inner surface 111b.

The first tab 111d may be disposed on at least a portion of the first side wall 111c.

The first semicircular portion 111e may be disposed on a first end of the first section 111.

The first semicircular portion 111e may include a seal-receiving groove 111e1 and an interlocking member 111e2, but is not limited thereto.

The plurality of supporting members 111f may be disposed on at least a portion of the first outer surface 111a. Each of the plurality of supporting members 111f may extend at various distances away from the first outer surface 111a. More specifically, each of the plurality of supporting members 111f may have a different height along a length thereof, such that a first end of each of the plurality of supporting members 111f may have a different height with respect to a second end of each of the plurality of supporting members 111f. Furthermore, the plurality of supporting members 111f may stabilize the main body 110 while disposed upon an object and/or an external surface.

The second section 112 is constructed to be identical with respect to the first section 111.

As such, the second section 112 may include a second outer surface 112a, a second inner surface 112b, a second side wall 112c, a second tab 112d, a second semicircular portion 112e, and a plurality of supporting members 112f, but is not limited thereto.

The second outer surface 112a may be disposed on any object and/or any external surface, such as a table and/or a countertop. The second inner surface 112b may receive at least one item thereupon. The second side wall 112c may be disposed around the second outer surface 112a. Moreover, the second side wall 112c may extend in a direction away from the second outer surface 112a, such that the second side wall 112c may be elevated with respect to the second inner surface 112b.

The second tab 112d may be disposed on at least a portion of the second side wall 112c.

The second semicircular portion 112e may be disposed on a first end of the second section 112.

The second semicircular portion 112e may include a seal-receiving groove 112e1 and an interlocking member 112e2, but is not limited thereto.

The plurality of supporting members 112f may be disposed on at least a portion of the second outer surface 112a. Each of the plurality of supporting members 112f may extend at various distances away from the second outer surface 112a. More specifically, each of the plurality of supporting members 112f may a different height along a length thereof, such that a first end of each of the plurality of supporting members 112f may have a different height with respect to a second end of each of the plurality of supporting members 112f. Furthermore, the plurality of supporting members 112*f* may stabilize the main body 110 while disposed upon an object and/or an external surface.

The plurality of sealing members 120 may include a first seal 121 and a second seal 122, but is not limited thereto.

The first seal 121 may include a first planar surface 121*a*, a first semicircular surface 121*b*, a first recessed portion 121*c*, and a first interlocking member-receiving aperture 121*d*, but is not limited thereto.

The first seal 121 may be removably disposed within at least a portion of the seal-receiving groove 111*e*1. More specifically, the first semicircular surface 121*b* may be inserted within at least a portion of the seal-receiving groove 111*e*1, such that the first interlocking member-receiving aperture 121*d* may receive the interlocking member 111*e*2 therein. In other words, the interlocking member 111*e*2 may be inserted into the first interlocking member-receiving aperture 121*d* to prevent movement of the first seal 121 within the seal-receiving groove 111*e*1.

Also, the first recessed portion 121*c* may create pointed edges on at least a portion of the first semicircular surface 121*b* to resist movement of the first seal 121 within the seal-receiving groove 111*e*1.

The second seal 122 is constructed to be identical with respect to the first seal 121.

As such, the second seal 122 may include a second planar surface 122*a*, a second semicircular surface 122*b*, a second recessed portion 122*c*, and a second interlocking member-receiving aperture 122*d*, but is not limited thereto.

The second seal 122 may be removably disposed within at least a portion of the seal-receiving groove 112*e*1. More specifically, the second semicircular surface 122*b* may be inserted within at least a portion of the seal-receiving groove 112*e*1, such that the second interlocking member-receiving aperture 122*d* may receive the interlocking member 112*e*2 therein. In other words, the interlocking member 112*e*2 may be inserted into the second interlocking member-receiving aperture 122*d* to prevent movement of the second seal 122 within the seal-receiving groove 112*e*1.

Also, the second recessed portion 122*c* may create pointed edges on at least a portion of the second semicircular surface 122*b* to resist movement of the second seal 122 within the seal-receiving groove 112*e*1.

Figure 3B:
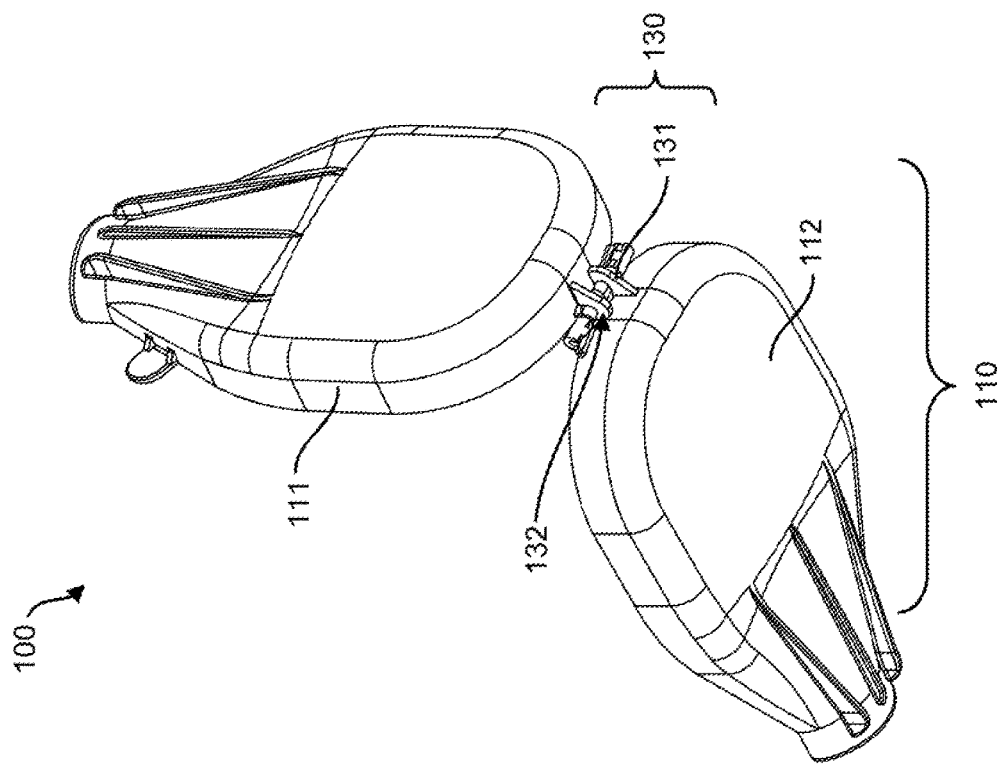
FIG. 3B illustrates a bottom isometric view of the utensil protection device in an opened position, according to an exemplary embodiment of the present general inventive concept.
Figure 3A:
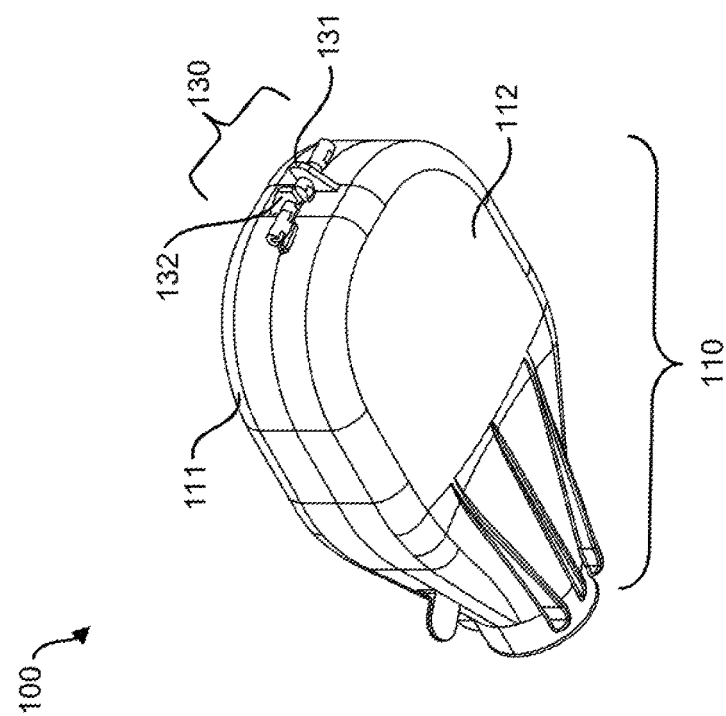
FIG. 3A illustrates a bottom isometric view of the utensil protection device in a closed position, according to an exemplary embodiment of the present general inventive concept.

FIG. 3A illustrates a bottom isometric view of the utensil protection device 100 in a closed position, according to an exemplary embodiment of the present general inventive concept.

FIG. 3B illustrates a bottom isometric view of the utensil protection device 100 in an opened position, according to an exemplary embodiment of the present general inventive concept.

The hinge 130 may include a first angled bracket 131 and a second angled bracket 132, but is not limited thereto.

The hinge 130 may be disposed on at least a portion of the second end of the main body 110 to facilitate movement of the main body 110. Additionally, the first angled bracket 131 may be disposed on a first end of the first section 111, and the second angled bracket 132 may be disposed on a first end of the second section 112.

The hinge 130 connects the first section 111 to the second section 112, such that the first section 111 may pivot with respect to the second section 112, and vice versa. Specifically, the first section 111 may pivot from a first position (i.e. closed) to at least partially toward a second position (i.e. opened).

The first tab 111*d* and/or the second tab 112*d* may facilitate gripping thereof, such that the first section 111 and/or the second section 112 may be moved.

Additionally, the first semicircular portion 111*e* and the second semicircular portion 112*e* may form the circular portion of the main body 110 in response to moving the first section 111 and/or the second section 112 from the second position to the first position, such that the main body 110 is closed.

Referring to FIGS. 3A and 3B, the first angled bracket 131 may be oriented such that a portion, thereof, contacts at least a portion of the second end of the second section 112 in response to the first section 111 and/or the second section 112 being completely opened. Similarly, the second angled bracket 132 may be oriented such that a portion, thereof, contacts at least a portion of the second end of the first section 111 in response to the first section 111 and/or the second section 112 being completely opened. In other words, the first angled bracket 131 and the second angled bracket 132 may prevent the first section 111 and/or the second section 112 from movement beyond a predetermined position (i.e. a completely opened position), such as the first section 111 being at a ninety-degree angle with respect to the second section 112. Alternatively, the first angled bracket 131 and/or the second angled bracket 132 may be constructed such that movement of the first section 111 and/or the second section 112 may not be restricted.

Furthermore, the first planar surface 121*a* of the first seal 121 may contact at least a portion of the second planar surface 122*a* of the second seal 122 in response to closing the main body 110, such that plurality of sealing members 120 may prevent an interior of the main body 110 from contamination.

Figure 4:
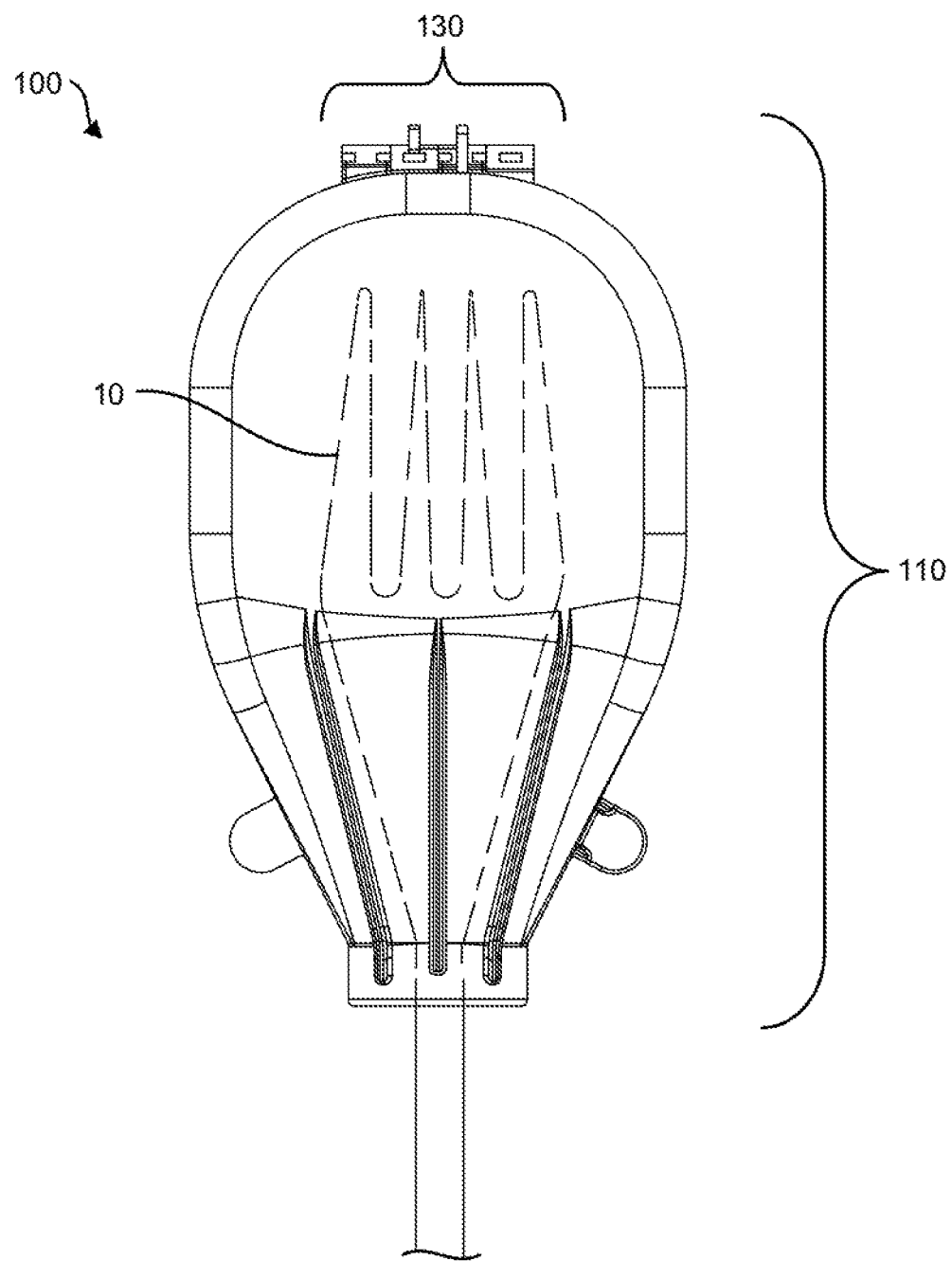
FIG. 4 illustrates a top view of the utensil protection device including a head of a utensil disposed therein, according to an exemplary embodiment of the present general inventive concept.

FIG. 4 illustrates a top view of the utensil protection device 100 including a head of a utensil 10 disposed therein, according to an exemplary embodiment of the present general inventive concept.

Also, the plurality of sealing members 120 may prevent the head of the utensil 10 from contamination. The utensil 10 may include a fork, a knife, a spoon, a spork, a chopstick, etc. The first seal 121 and/or the second seal 122 may at least partially deform in response to contact with at least a portion of the utensil 10. However, at least a portion of the first seal 121 may connect to at least a portion of the second seal 122 around at least a portion of the utensil 10 to create an airtight seal and/or a liquidproof seal.

Therefore, the utensil protection device 100 may prevent the utensil 10 from contamination from an external source. As such, the utensil protection device 100 may protect the head of the utensil 10, such that the utensil 10 may be kept in any location without risk of contamination.

The present general inventive concept may include a utensil protection device 100, including a main body 110 to store a head of a utensil 10 therein, a plurality of sealing members 120 removably disposed on a first end of the main body 110 within at least a portion of the main body 110 to prevent the head of the utensil 10 from contamination, and a hinge 130 disposed on a second end of the main body 110 to facilitate movement of the main body 110 from closed in a first position to at least partially opened in a second position.

The main body 110 may include a first section 111, and a second section 112 to pivot with respect to the first section 111.

The plurality of sealing members 120 may include a first seal 121 removably disposed within a first end of the first section 111, and a second seal 122 removably disposed within a first end of the second section 112.

The hinge 130 may include a first angled bracket 131 disposed on a second end of the first section 111 to prevent movement of the first section 111 beyond a predetermined position in response to contact with at least a portion of the second section 112, and a second angled bracket 132 disposed on a second end of the second section 112 to prevent movement of the second section 112 beyond the predetermined position in response to contact with at least a portion of the first section 111.

Each of the plurality of sealing members 120 deforms in response to contact with at least a portion of the utensil 10.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A utensil protection device, comprising:
   a main body to store a head of a utensil therein, the main body comprising:
      a plurality of seal-receiving grooves, and
      a plurality of interlocking members disposed within at least a portion of the plurality of seal-receiving grooves;
   a plurality of sealing members removably disposed within at least a portion of the plurality of seal-receiving grooves to prevent the head of the utensil from contamination, each of the plurality of sealing members receive at least one of the plurality of interlocking members therein to prevent movement of the plurality of sealing members within the plurality of seal-receiving grooves; and
   a hinge disposed on a second end of the main body to facilitate movement of the main body from closed in a first position to at least partially opened in a second position.

2. The utensil protection device of claim 1, wherein the main body comprises:
   a first section; and
   a second section to pivot with respect to the first section.

3. The utensil protection device of claim 2, wherein the plurality of sealing members comprises:
   a first seal removably disposed within a first end of the first section; and
   a second seal removably disposed within a first end of the second section.

4. The utensil protection device of claim 3, wherein the hinge comprises:
   a first angled bracket disposed on a second end of the first section to prevent movement of the first section beyond a predetermined position in response to contact with at least a portion of the second section; and
   a second angled bracket disposed on a second end of the second section to prevent movement of the second section beyond the predetermined position in response to contact with at least a portion of the first section.

5. The utensil protection device of claim 1, wherein each of the plurality of sealing members deforms in response to contact with at least a portion of the utensil.

\* \* \* \* \*